Figure 1:
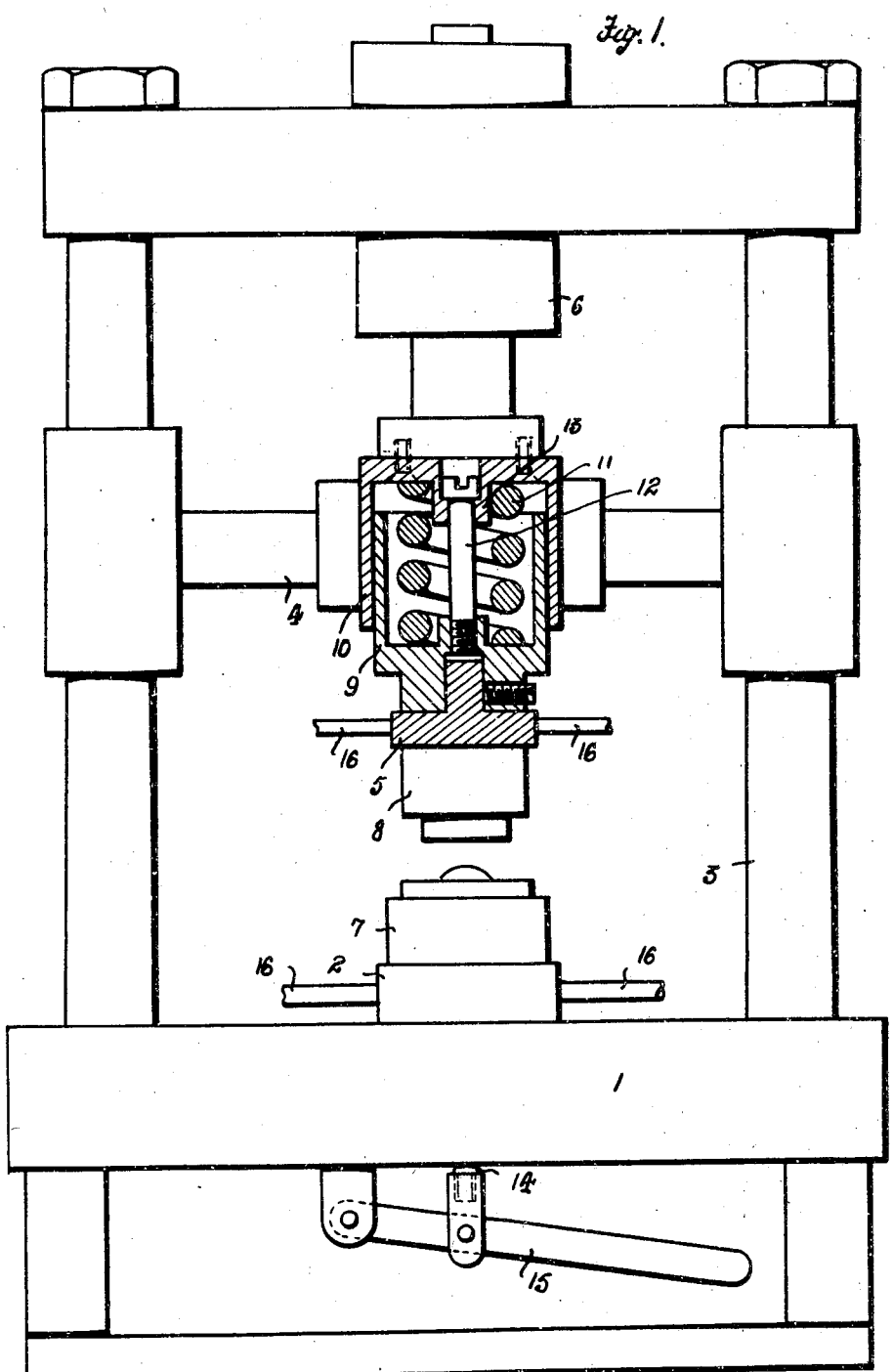

Oct. 4, 1949.    A. KINGSTON    2,483,832
METHOD OF MANUFACTURING ARTIFICIAL EYES
Filed Feb. 15, 1947    2 Sheets-Sheet 1

INVENTOR
ARTHUR KINGSTON

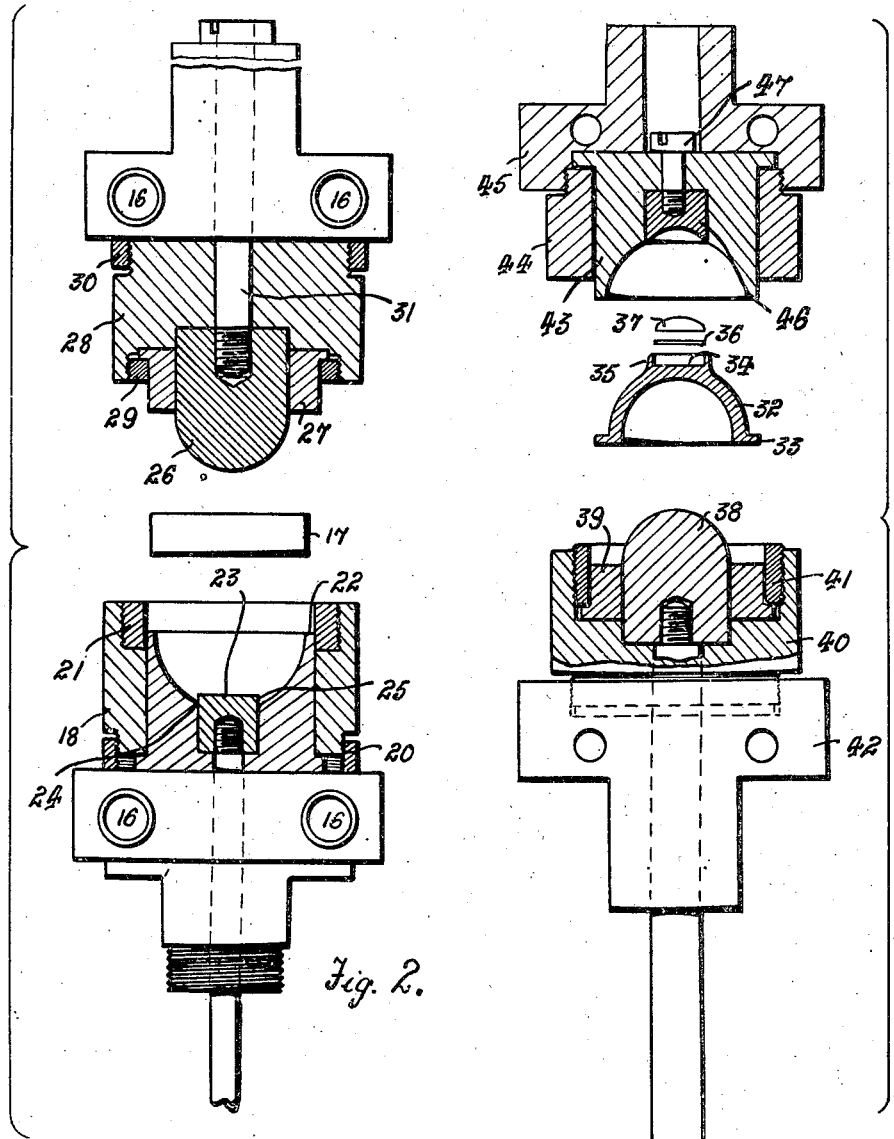

UNITED STATES PATENT OFFICE 2,483,832

METHOD OF MANUFACTURING ARTIFICIAL EYES

Arthur Kingston, Denham, England

Application February 15, 1947, Serial No. 728,917
In Great Britain February 18, 1946

8 Claims. (Cl. 18—59)

Artificial eyes are today largely made of plastics such as acrylic resin, and eyes made of such material have many recognized advantages over eyes made of glass. Hitherto the manufacture of eyes from plastics has been by hand work and has involved as a rule the preparation of a wax mould or pattern, the investment of the pattern in plaster in a "flask," the introduction by hand of the acrylic resin or other plastic made into a dough from powder, the formation of a recess in the sclera to take the iris and cornea, and other steps which make the production of an eye a laborious matter.

According to the present invention the manufacture of artificial eyes of plastic is carried out almost entirely mechanically in a series of operations involving the steps of first moulding a plastic such as for example polystyrene, methyl methacrylate to form a concavo-convex sclera body with a recess in the convex surface thereof, inserting an iris disc and a corneal button in said recess and subjecting the assembly of sclera, iris disc and corneal button to a combined heating and pressing to marry the sclera body and corneal button.

The plastic may first be given the form of a tablet or medallion blank either by injection moulding or by trepanning from a sheet, the tablet or medallion being preheated and thereafter pressed in a heated closed or positive die to produce the concavo-convex or hemi-spherical, and recessed sclera body and thereafter cooled.

The pressure die is preferably operated through a resiliently mounted or "follow-up" piston or plunger whereby pressure is continuously exerted on the sclera body during cooling and shrinking of the material, to avoid formation of surface inaccuracies and ensure production of a close replica of die contour. The sclera body is removed at room temperature and is then veined or lined, to suit requirements, with a pointed engraving tool, and a stain is inserted in the veining and allowed to dry, the superfluous stain being removed. An iris disc accurately fitting the recess and a corneal button made of methyl methacrylate for example, are placed in the recess and the sclera, iris and cornea assembly are inserted between the sections of a cold closed die which is operated through a resilient piston or plunger to close it. The die is then heated to a temperature at which the material of the cornea, iris and sclera marry, a low pressure being maintained for a period sufficient to permit the die and material to reach the marrying temperature. Thereafter with the temperature maintained, the pressure is increased up to from 1 to 3 tons per sq. inch, for from 15 to 30 seconds. Then cooling is applied, the high pressure being retained until the die and material are cool.

One form of apparatus for use in carrying out the invention is illustrated in the accompanying drawings in which Fig. 1 is a view in part sectional elevation of a suitable press, Fig. 2 is a sectional view on a larger scale of the parts of a closed die as used in the press of Fig. 1 for moulding the sclera with recess, Fig. 3 is a view similar to Fig. 2 but of a pair of closed die parts suitable for use in the press of Fig. 1, for marrying the assembly of sclera, iris disc and corneal button, Fig. 4 is a sectional view showing the assembly of parts before the marrying operation, Fig. 5 shows a detail view of a convenient form of corneal button and Fig. 6 shows an alternative.

Referring to the drawings, the press illustrated comprises a fixed bed 1 supporting a lower die holder 2 and columns 3 which serve to support and guide a carrier 4 for a rising and falling upper die holder 5, an hydraulic cylinder 6 of conventional form being provided to impart downward movement with pressure to the carrier 4 or upward movement thereto to separate the die parts 7 and 8 carried by the die holders 2 and 5 respectively. The upper die holder 5 is connected with the carrier 4 through what may be termed a secondary or follow-up pressure structure consisting of an inner cylindrical body 9 arranged to make vertical sliding movements of limited extent in an outer cylinder 10 forming part of or mounted fixedly in the carrier 4 and a powerful compression spring 11 is mounted between the opposed ends of the cylinders 9 and 10. Movements of cylinder 9 in the cylinder 10 under the urge of spring 11 are limited by means of a bolt 12 screwed at its lower end into a central boss in cylinder 9, whilst its upper end is guided for sliding movement in a central hollow boss 13 in the cylinder 10. Ejector mechanism such as a plunger 14 operable by means of a lever 15 is provided whereby the die part, or at least the central portion thereof, in the lower die holder 2 may be raised after the die parts have been separated upon completion of a moulding operation, to eject the moulded article. Steam heating and water cooling pipes 16 are connected in known manner between the die holders 2 and 5 and suitable sources of steam and cooling water (not shown) to enable the die holders and therefore the die parts and the work to be heated or cooled as required.

In the production of an artificial eye by the method according to the invention I may start with a circular tablet or medallion represented in elevation at 17 in Fig. 2, of plastic such for example as polystyrene, methyl methacrylate produced either by injection moulding or by trepanning from a sheet.

The tablet 17 is moulded by means of a closed die formed of parts such as are shown in Fig. 2 fitted in a press such as that illustrated in Fig. 1.

The lower die part in Fig. 2 comprises an outer cylindrical housing 18 containing a female die part 19 of hollow substantially hemi-spherical shape, the housing 18 being screwed to the die holder 2 as shown at 20 and serving to retain the die part 19 in position on the die holder. The die part 19 at its outer end is surrounded by a hard steel collar 21 screwed into a counterbore in the housing 18 and the end of the die part 19 itself terminates in an annular shoulder 22.

The die part 19 is centrally apertured and the aperture is filled by a plane faced substantially cylindrical block 23 disposed with its plane end face horizontal, said block being capable of sliding in the aperture in the die part 19 upwards from the position shown in Fig. 2, being mounted on the ejector plunger 14 of the press.

The edge of the aperture in die part 19, filled by block 23, is chamfered as shown at 24 so that an annular recess 25 of generally V-shape in section is formed between the outer periphery of the block 23 and the chamfer. The inner boundary of the annular recess 25 is very slightly inclined inwardly towards the axis of the die part 19 in the upward direction but only by an angle of a few degrees sufficient to ensure easy disengagement of the sliding block 23 from moulded material filling the recess 25.

The upper die part in Fig. 2 comprises a male element 26 of approximately hemi-spherical form with a surrounding shoulder 27, connected with a recessed housing member 28 by means of a screwed ring 29, the housing member 28 being itself screw connected, as shown at 30, with the upper die holder 5. For convenience in die construction the hemi-spherical element 26 may be formed separately from the die portion forming the shoulder 27, being an accurate fit in a central aperture therein and being retained by a screw 31 passing through the die holder 5. The upper die part bearing the shoulder 27 is an accurate fit in the collar 21 of the lower die part.

The tablet 17 is an approximate fit in the nest within ring 21 and above the annular shoulder 22 of the lower die part 19 and both the tablet and the die are preheated before the tablet is inserted in the ring 21.

With the lower die part disposed as shown in Fig. 2 and being heated by the passage of steam through the pipes 16, pressure is introduced to the hydraulic cylinder 6 of the press to lower the upper die carrier 4 and the upper die part also being heated, so that the tablet is subjected to heat and pressure in the closed mould space formed as the upper and lower die parts mate and is moulded to form a sclera body of the shape shown in section at 32 in Fig. 3, that is to say, a body of concavo-convex form with an outwardly projecting edge flange 33 at the base and a recess 34 at the summit of the outer or convex surface, the recess being surrounded by a projecting parapet or wall 35 formed by material which has been caused to enter the V-shaped annular recess 25 in the lower die part. The formation of the sclera body 32, recess 34 and parapet or wall 35 is thus effected in a single moulding operation.

The moulded body is cooled while still in the die, the die remaining closed and the pressure being maintained during the cooling and shrinking of the material by means of the follow-up pressure exerted by the spring 11 of the press, it being understood that the spring 11 is slightly compressed when the upper die part has first been lowered to mould the article.

By this means the formation of surface inaccuracies during cooling is avoided and the production of an exact replica of the die contour is ensured.

The press is now operated to separate the die parts and the moulded article removed preferably at about room temperature and if necessary making use of the ejector lever 15. The thus formed sclera body is now veined or lined on its convex surface to suit requirements, with a pointed engraving tool, and a stain is inserted in the veining and allowed to dry, superfluous stain being removed.

Next, an iris disc 36 (Figs. 3 and 4) accurately fitting the recess and a corneal button 37 made of a transparent plastic such as methyl methacrylate for example, are placed in the recess 34 (Fig. 4) and the assembly of sclera, iris disc and corneal button is inserted between the upper and lower parts of a closed die such as is shown in Fig. 3 also adapted for use in a press such as that of Fig. 1.

The lower die part shown in Fig. 3 comprises the central substantially hemi-spherical projection 38 mounted within an apertured body 39 secured inside a housing member 40 by means of a screwed retaining ring 41, the housing member 40 being screwed or otherwise secured to the die holder 42. The central projection is connected with an ejector rod extending through the die holder 42 for operation by an ejector lever such as 15 of Fig. 1.

The upper die part comprises the substantially hemi-spherically recessed central part 43 fitted within a housing member 44 screwed to the die holder 45, the end of this centrally recessed part 43 being an accurate fit within the ring 41 of the lower die part.

The recessed central part 43 is provided with a central counterbored aperture and the inner and larger end of the aperture is filled by a shaped plug 46 retained by a screw 47 inserted through the outer and smaller end of the aperture. The lower surface of the plug conforms to a curvature of smaller radius than that of the hemi-spherical central part 43 but merges with the surface of the latter, to produce an appropriate corneal bulge.

The die holders 42 and 45 are provided with passages 48 for the circulation of heating and cooling fluids.

With the die parts cold the upper die part is lowered onto the assembly of sclera, iris disc and corneal button located in the lower die part also cold. The die is now heated up and a low pressure is maintained for a period sufficient for the marrying temperature to be attained. Thereafter with the marrying temperature maintained, the pressure is increased up to from 1 to 3 tons per sq. in. for from 15 to 30 seconds during which the sclera, iris and corneal button become an effective integral whole. The die parts and the work piece are now cooled, the high pressure being maintained until both the die parts and the work piece are cool again so that the occurrence of surface imperfections during shrinkage is avoided and a replica of the die contour ensured.

The components used to make or complete eyes are formed to near accurate dimensions so that when assembled they are a good fit in the closed marrying die. The circular flange 33 around the base of the sclera preform, usually about 1 mm. thick, ensures supply of the required amount of material if the bulk of the components are a trifle undersize.

The article after removal from the marrying die is now cut or machined to the form necessary to fit the patient's socket.

To produce the desired limbus effect at the border of the iris, there is produced an overlapping of the edge of the recess in the sclera onto the edge of the cornea and this is effected by deformation during the marrying step of the wall or parapet 35 formed round the recess 34 during the sclera body moulding step, and if necessary accompanied by a bevelling off of the edge of the corneal button 37. It is preferable that the corneal button 37 has a higher melting point than the sclera body to avoid distortion of the edge of the cornea.

The degree of limbus effect can be varied by altering the amount of material in the parapet 35 in combination with change in the angle of bevel of the boundary of the corneal button. Fig. 5 shows a convenient form of corneal button having a flat base 12.6 mm. in diameter, radius of curvature 9 mm., a maximum thickness of 3.3 mm. and a base edge angle of 65°.

In order that the image of the iris may be properly displayed, it is desirable to insert between the iris disc and the cornea a thin disc of transparent foil, for example of polystyrene, or the cornea itself may be made of polystyrene or like material to effect complete optical junction between the iris disc and corneal button. This foil serves somewhat the same purpose as the Canada balsam used between glass lenses.

A disc of similar material may be inserted between the iris and the bottom of the recess, and this will ensure that the iris adheres properly to the sclera and, if the iris is translucent, may serve to modify the colour of the iris. A disc of thin silk tissue paper can also be used.

The iris may be coated on both sides with plastic material, the material on one side having the characteristics of the sclera material and the material on the other side the characteristics of the cornea material, in which case the disc of transparent foil may be dispensed with. The material between the iris disc and the cornea should preferably be such as to have the same refractive index as the material of the corneal button in order to avoid reflection of high lights visible across the iris area.

When a coating of a material of different refractive index such as gelatine is employed surface reflections can be avoided by the use of very fine mesh Japanese rice paper between the iris and corneal button. Under the heat and pressure the paper disc merges into the gelatine and button and serves to eliminate all internal reflection.

The veining of the sclera produced as above described and filled with water or spirit stain as used in microscopy is permanent and the walls of the engraving are closed up and made to meet over the stain by the pressure applied during the marrying operation.

The iris disc may be made of paper, celluloid, gelatine or other suitable material and the iris image produced photographically or otherwise.

In an alternative arrangement, instead of forming a projecting parapet 35 around the recess 34 during the first die moulding operation a simple recess may be formed for the reception of the iris disc and corneal button and a ring of plastic of wedge shape in cross section inserted in the space between the wall of the recess and the boundary of the corneal button (see Fig. 6) before subjecting the assembly to the marrying operation in which the wedge shaped ring is folded over the corneal button.

Again, instead of first forming the concavo-convex sclera body with the recess in the convex surface by the use of a heating and pressing die such as that described above with reference to Figure 2, the recessed body may be produced by the method of projection moulding.

I claim:

1. A method of manufacturing artificial eyes from plastics, said method including the steps of first moulding to form a concavo-convex sclera body with a recess in the convex surface thereof; inserting an iris disc and a corneal button in said recess; subjecting the assembly of sclera, iris disc and corneal button to combined heating and heavy pressure to marry the sclera body, the iris disc and the corneal button and to cause material at the boundary of the said recess to deform and produce an overlap of wedge section tapering to an edge in the direction radially towards the centre of the cornea; and cooling the resulting artificial eye in the mould, whilst simultaneously applying a follow-up pressure thereto.

2. A method of manufacturing artificial eyes from plastics, said method including the steps of first moulding to form a concavo-convex sclera body with a recess in the convex surface thereof and a projecting annular parapet surrounding said recess; inserting an iris disc and a corneal button in said recess; subjecting the assembly of sclera, iris disc and corneal button to combined heating and heavy pressure to marry the sclera body, the iris disc and the corneal button and to cause the projecting parapet to deform and produce an annular overlap of wedge section tapering to an edge in the direction radially towards the centre of the cornea; and cooling the resulting artificial eye in the mould, whilst simultaneously applying a follow-up pressure thereto.

3. A method of manufacturing artificial eyes from plastics, said method including the steps of forming a tablet of the plastic; subjecting said tablet to heat and pressure to form a sclera body of concavo-convex form and simultaneously a recess in the convex surface of the said sclera body; inserting an iris disc and a corneal button in said recess; subjecting the assembly of sclera, iris disc and corneal button to combined heating and heavy pressure to marry the sclera body, the iris disc and the corneal button and to cause material at the boundary of the said recess to deform and produce an overlap of wedge section tapering to an edge in the direction radially towards the centre of the cornea; and cooling the resulting artificial eye in the mould, whilst simultaneously applying a follow-up pressure thereto.

4. A method of manufacturing artificial eyes from plastics, consisting in cutting a tablet from a sheet of plastic; subjecting said tablet to heat and pressure to form a sclera body of concavo-convex form and simultaneously a recess in the convex surface of the said sclera body; inserting an iris disc and a corneal button in said recess; subjecting the assembly of sclera, iris disc and corneal button to combined heating and heavy pressure to marry the sclera body, the iris disc and the corneal button and to cause material at the boundary of the said recess to deform and produce an overlap of wedge section tapering to an edge in the direction radially towards the centre of the cornea; and cooling the resulting artificial eye in the mould, whilst simultaneously applying a follow-up pressure thereto.

5. A method of manufacturing artificial eyes from plastics, said method including the steps of first moulding to form simultaneously a concavo-convex sclera body, a recess in the convex surface thereof, a projecting annular parapet surrounding said recess and a flange on the periphery of said body; inserting an iris disc and a corneal button having the boundary of a truncated cone in said recess; subjecting the assembly of sclera body, iris disc and corneal button to combined heating and heavy pressure to marry the sclera body, the iris disc and the corneal button and to cause the parapet to deform and produce an annular overlap of wedge section tapering to an edge in the direction radially towards the centre of the cornea; and cooling the resulting artificial eye in the mould, whilst simultaneously applying a follow-up pressure thereto.

6. A method of manufacturing artificial eyes from plastics, said method including the steps of first moulding to form a concavo-convex sclera body with a recess in the convex surface thereof; inserting into the said recess an iris disc, coated on at least its outer surface with a thin layer of a transparent bonding material; inserting a corneal button into said recess over said coated iris disc; subjecting the assembly of sclera body, coated iris disc and corneal button to combined heating and heavy pressure to marry the parts of the assembly and to cause material at the boundary of the said recess to deform and produce an overlap of wedge section tapering to an edge in the direction radially towards the centre of the cornea; and cooling the resulting artificial eye in the mould, whilst simultaneously applying a follow-up pressure thereto.

7. A method of manufacturing artificial eyes from plastics, said method including the steps of first moulding to form a concavo-convex sclera body with a recess in the convex surface thereof; inserting into said recess an iris disc coated on at least its outer surface with a thin layer of a transparent bonding material; covering said coated iris disc in said recess with a layer of thin rice paper; inserting a corneal button into said recess over the covering of rice paper; subjecting the assembly to a combined heating and heavy pressure to marry the sclera body, the iris disc and the corneal button, to disperse the rice paper into the transparent bonding material, and to cause material at the boundary of the said recess to deform and produce an overlap of wedge section tapering to an edge in the direction radially towards the centre of the cornea; and cooling the resulting artificial eye in the mould, whilst simultaneously applying a follow-up pressure thereto.

8. A method of manufacturing artificial eyes from plastics, said method including the steps of first moulding to form simultaneously a concavo-convex sclera body and a recess in the convex surface thereof; inserting an iris disc into said recess; inserting a corneal button having an outer boundary of truncated conical form into said recess over said iris disc; inserting a ring of a transparent plastic of wedge section into the space between the boundaries of the recess and the corneal button; subjecting the assembly to combined heating and heavy pressure to marry the sclera body, the iris disc, the corneal button and the plastic ring and to cause the plastic ring to deform and produce an annular overlap of wedge section tapering to an edge in the direction radially towards the centre of the cornea; and cooling the resulting artificial eye in the mould, whilst simultaneously applying a follow-up pressure thereto.

ARTHUR KINGSTON.

REFERENCES CITED

The following references are of record in the file of this patent:

UNITED STATES PATENTS

| Number | Name | Date |
| --- | --- | --- |
| 1,981,334 | Schmalz | Nov. 20, 1934 |
| 2,196,066 | Feinbloom | Apr. 2, 1940 |
| 2,241,415 | Moulton | May 13, 1941 |
| 2,337,701 | Weinberg | Dec. 28, 1943 |
| 2,388,297 | Slaughter | Nov. 6, 1945 |